(12) United States Patent
Balent et al.

(10) Patent No.: US 10,093,562 B2
(45) Date of Patent: Oct. 9, 2018

(54) METHODS AND COMPOSITIONS FOR THE TREATMENT AND RECOVERY OF PURGE SOLVENT

(71) Applicant: Ecolab USA Inc., St. Paul, MN (US)

(72) Inventors: Paul Balent, Cincinnati, OH (US);
Gordon M. Carter, Evanston, IL (US);
Samuel P. Mooney, Birmingham, AL (US); David W. Scheimann, Joliet, IL (US); Shayne B. Hare, Sugar Grove, IL (US); Joseph P. Miknevich, Coraopolis, PA (US)

(73) Assignee: ECOLAB USA INC., St. Paul, MN (US)

( * ) Notice: Subject to any disclaimer, the term of this patent is extended or adjusted under 35 U.S.C. 154(b) by 327 days.

(21) Appl. No.: 14/068,624

(22) Filed: Oct. 31, 2013

(65) Prior Publication Data

US 2014/0053872 A1 Feb. 27, 2014

Related U.S. Application Data

(63) Continuation-in-part of application No. 12/490,909, filed on Jun. 24, 2009, now Pat. No. 8,591,744.

(51) Int. Cl.
*C02F 1/52* (2006.01)
*C08L 3/08* (2006.01)
(Continued)

(52) U.S. Cl.
CPC .............. *C02F 1/52* (2013.01); *C02F 1/5245* (2013.01); *C02F 1/54* (2013.01); *C02F 1/56* (2013.01);
(Continued)

(58) Field of Classification Search
CPC .......... C02F 1/56; C02F 2103/14; C02F 1/52; C02F 1/5245; C02F 1/66; C02F 1/38; B08B 3/14; C08L 3/08; C08L 3/00
See application file for complete search history.

(56) References Cited

U.S. PATENT DOCUMENTS 3,578,475 A * 5/1971 Alexander ............ C08B 31/125
106/127.1
4,435,308 A 3/1984 Thomas et al.
(Continued)

FOREIGN PATENT DOCUMENTS

CN 1919475 A 2/2007
CN 102351286 A 2/2012
(Continued)

OTHER PUBLICATIONS

International Search Report and Written Opinion for International Application No. PCT/US2010/039323, dated Feb. 22, 2011 (7 pages).
(Continued)

*Primary Examiner* — John Kim
(74) *Attorney, Agent, or Firm* — Eric D. Babych; Brinks Gilson & Lione

(57) ABSTRACT

The present disclosure relates to purge fluids, methods of using the purge fluids, and systems to be used for recycling the purge fluids. In some aspects, the purge fluid may be used to clean or purge an automated spray coating apparatus, such as a paint gun. The purge fluid may include a solvent and water. After the purge fluid is utilized for purging or cleaning certain system components, the purge fluid may be treated, subjected to a liquid-solid separation technique, and reused as a purge fluid.

17 Claims, 1 Drawing Sheet

(51) Int. Cl.
*C02F 1/56* (2006.01)
*C02F 1/54* (2006.01)
*C02F 1/66* (2006.01)
*C02F 1/38* (2006.01)
*C02F 1/00* (2006.01)
*C02F 103/14* (2006.01)
*B08B 3/14* (2006.01)
*B05B 14/468* (2018.01)

(52) U.S. Cl.
CPC ............... *C08L 3/08* (2013.01); *B05B 14/468* (2018.02); *B08B 3/14* (2013.01); *C02F 1/001* (2013.01); *C02F 1/38* (2013.01); *C02F 1/66* (2013.01); *C02F 2103/14* (2013.01); *C02F 2209/06* (2013.01)

(56) References Cited

U.S. PATENT DOCUMENTS

| | | | |
|---|---|---|---|
| 4,564,464 A | | 1/1986 | Harpel et al. |
| 4,888,386 A | | 12/1989 | Huang et al. |
| 4,913,825 A | | 4/1990 | Mitchell |
| 5,068,279 A | | 11/1991 | Morse |
| 5,072,881 A | | 12/1991 | Taube |
| 5,236,598 A | * | 8/1993 | Hunter ...................... C02F 1/54 134/38 |
| 5,240,509 A | | 8/1993 | Rey et al. |
| 5,248,440 A | | 9/1993 | Mitchell et al. |
| 5,250,189 A | | 10/1993 | Rey et al. |
| 5,294,352 A | | 3/1994 | Waldmann |
| 5,719,224 A | | 2/1998 | Agree et al. |
| 5,836,321 A | | 11/1998 | Kaneski et al. |
| 5,972,865 A | | 10/1999 | Knipe, Jr. et al. |
| 6,033,525 A | | 3/2000 | Moffett |
| 6,136,200 A | | 10/2000 | Waldmann |
| 6,485,656 B1 | | 11/2002 | Meyer et al. |
| 6,673,263 B2 | | 1/2004 | Albu et al. |
| 6,858,093 B2 | | 2/2005 | Albu et al. |
| 7,338,604 B2 † | | 3/2008 | Wilson |
| 8,591,744 B2 | | 11/2013 | Miknevich et al. |
| 2003/0026906 A1 | | 2/2003 | Albu et al. |
| 2004/0084373 A1 | | 5/2004 | Wilson |
| 2004/0104178 A1 | | 6/2004 | Mahoney et al. |
| 2006/0122086 A1 | | 6/2006 | Albu et al. |
| 2006/0254737 A1 | * | 11/2006 | Anderson ............. C08B 31/003 162/175 |
| 2010/0326923 A1 | | 12/2010 | Miknevich et al. |
| 2014/0053872 A1 | | 2/2014 | Balent et al. |
| 2014/0251921 A1 | | 9/2014 | Miknevich et al. |

FOREIGN PATENT DOCUMENTS

| | | |
|---|---|---|
| JP | 52-31989 A | 3/1977 |
| JP | H 06114210 A | 4/1994 |
| JP | 6-509371 A | 10/1994 |
| JP | H 07713 A | 1/1995 |
| JP | H 0938415 A | 2/1997 |
| JP | 11-500953 A | 1/1999 |
| JP | H 11672 A | 1/1999 |
| JP | 2006061776 A | 3/2006 |
| JP | 2007245150 A | 9/2007 |
| JP | 5523207 B2 | 6/2014 |
| WO | WO 93/02147 A1 | 4/1993 |
| WO | WO 96/26905 A1 | 9/1996 |

OTHER PUBLICATIONS

International Search Report and Written Opinion for International Application No. PCT/US2014/059351, dated Jan. 8, 2015 (12 pages).

Supplementary European Search Report for related European Application No. 10797543, dated Aug. 7, 2013 (2 pages).

\* cited by examiner
† cited by third party

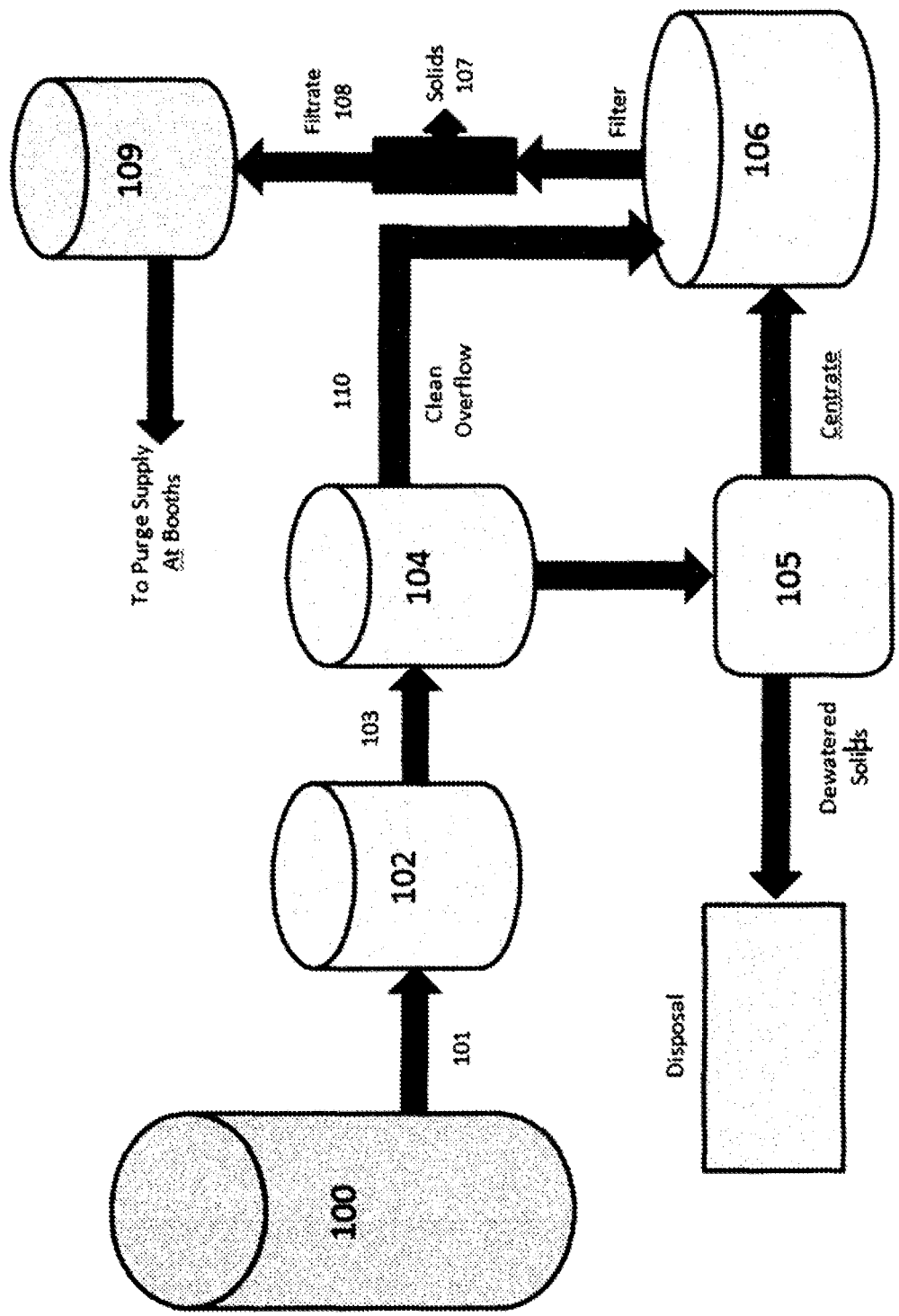

METHODS AND COMPOSITIONS FOR THE TREATMENT AND RECOVERY OF PURGE SOLVENT

CROSS-REFERENCE TO RELATED APPLICATIONS

This application is a continuation in part application claiming priority from U.S. patent application Ser. No. 12/490,909 filed on Jun. 24, 2009, issued U.S. Pat. No. 8,591,744.

STATEMENT REGARDING FEDERALLY SPONSORED RESEARCH OR DEVELOPMENT

Not applicable.

BACKGROUND OF THE INVENTION

The disclosure relates to compositions, methods, and apparatuses for recovering solvents and recycling water. More particularly, the disclosure relates to compositions and methods for recovering purge solvents and recycling spent purge water.

The art described in this section is not intended to constitute an admission that any patent, publication or other information referred to herein is "prior art" with respect to this disclosure, unless specifically designated as such. In addition, this section should not be construed to mean that a search has been made or that no other pertinent information as defined in 37 CFR § 1.56(a) exists.

In automotive assembly plants, paint is sprayed on various vehicle components to form a protective coating for the metal and plastic surfaces. The process may include application of multiple layers of different paints, and each layer may have a unique purpose. After preparing a component for painting, the first step typically includes applying a primer and this step is generally followed by an application of base coat (color coat) and then multiple layers of a clear coat. The primer layer provides a bonding surface or interface between the metal or plastic surface and the paint. The base coat provides color and bonds to the primer. The final layer is a clear coat which seals, provides a protective layer, and produces a glossy finish.

Cars of the same model are typically available in a variety of different colors and, as a result, plants typically spray many different colors of paint. Between each color change, the paint guns and the paint lines must be purged of the paint prior to the next color being sprayed. In order to keep the paint guns clean and operational, plants may use a purge fluid. During the paint gun cleaning process, often the purge fluid is pumped through the lines and the gun for rinsing and cleaning, and then usually captured in a spent (waste) purge fluid system. Current practice is to collect the spent purge in large tanks until it can be hauled off site for disposal. Some plants may spend well up to $700,000 or more discarding this waste each year.

Purge fluid used for cleaning paint guns and paint lines typically includes about 85%-95% water and about 1-15% solvent (often a 90:10, water:solvent ratio). After cleaning, the spent purge generally comprises water, solvent, and many different chemical components, which come from a wide variety of paint formulations being sprayed. The largest component of the spent purge is water, typically greater than 90%, so plants are spending large amounts of money to transport waste water off site for treatment and disposal.

On the other hand, some plants don't have a spent purge capture system. As a result, the purge is sprayed into the recirculating water system in the same general manner as paint overspray during normal painting operations. In these plants, the purge solvent is not reclaimed or recovered. During the purge flushes, the paint is not atomized as it contacts the water and thus, the paint tends to disperse and sink in the pit rather than float for removal. The only way to remove paint from the bottom of the pit is to shut down the system, drain the water, and dig it out using manual labor.

The present disclosure addresses the aforementioned problems by providing an apparatus, methods, and compositions for treating the waste material on site, recycling the water, and recovering the purge solvent so it may be reclaimed and reused.

BRIEF SUMMARY OF THE INVENTION

To satisfy the long-felt but unsolved needs identified above, at least one embodiment of this disclosure is directed towards a method of recovering purge fluid. Initially, the method comprises the step of providing spent purge fluid, which comprises water, a solvent, and waste material which can be solid. Then, an effective amount of one or more coagulants is added to the spent purge fluid and an effective amount of one or more flocculants is added to the spent purge fluid. Flocculated solid material is allowed to settle and then it is separated from the spent purge fluid. In some cases the waste does not settle but floats. In some cases the waste is removed with one or more separation processes.

In at least one embodiment, a method of reducing an amount of spent purge waste is disclosed. Initially, the method comprises the step of providing spent purge waste, which comprises water, a solvent, and a solid material. The method also comprises the steps of adding an effective amount of one or more coagulants to the spent purge waste and adding an effective amount of one or more flocculants to the spent purge waste, wherein the one or more flocculants facilitate flocculation of the solid material in the spent purge waste. The method further comprises the steps of allowing the flocculated solid material to settle, separating the flocculated solid material from the water and the solvent, recycling the water and solvent, and disposing of only the flocculated solid material.

Further, the present disclosure provides a method for cleaning a flow path of an automated painting apparatus. The method comprises the steps of providing an automated painting apparatus having a paint line in fluid communication with a paint gun and pumping a purge fluid into an end of the paint line, whereby the purge fluid travels through the paint line, into the paint gun, and out of an end of the paint gun. The method also comprises the steps of collecting the purge fluid in a tank, adding an effective amount of one or more coagulants to the purge fluid, and adding an effective amount of one or more flocculants to the purge fluid, wherein the one or more flocculants facilitate flocculation of solids in the purge fluid. The flocculated solids are allowed to settle, then are separated from the purge fluid and the separated purge fluid is transferred to a clean purge fluid supply tank. These steps may optionally be repeated any number of times and an additional optional step may be conducted wherein the separated purge fluid is filtered before it is transported into the clean purge fluid supply tank.

In at least one embodiment before and/or after the flocculant and/or coagulant are added to the liquid medium the medium undergoes mixing.

In at least one embodiment when the paint is separated from the liquid medium it settles on the bottom of the container holding the liquid medium. In at least one embodiment when the paint is separated from the liquid medium it floats on top of the liquid medium.

Additional features and advantages are described herein, and will be apparent from, the following Detailed Description.

BRIEF DESCRIPTION OF THE DRAWINGS

A detailed description of the invention is hereafter described with specific reference being made to the drawings in which:

FIG. 1 is a flow chart depicting an illustrative embodiment of the presently disclosed spent purge recycling system.

For the purposes of this disclosure, like reference numerals in the figures shall refer to like features unless otherwise indicated. The drawings are only an exemplification of the principles of the invention and are not intended to limit the invention to the particular embodiments illustrated.

DETAILED DESCRIPTION OF THE INVENTION

The following definitions are provided to determine how terms used in this application, and in particular how the claims, are to be construed. The organization of the definitions is for convenience only and is not intended to limit any of the definitions to any particular category.

"Coagulant" means a water treatment chemical often used in solid-liquid separation stage to neutralize charges of suspended solids/particles so that they can agglomerate, coagulants are often categorized as inorganic coagulants, organic coagulants, and blends of inorganic and organic coagulants, inorganic coagulants often include or comprise aluminum or iron salts, such as aluminum sulfate/chloride, ferric chloride/sulfate, polyaluminum chloride, and/or aluminum chloride hydrate, organic coagulants are often positively charged polymeric compounds with low molecular weight, including but not limited to polyamines, polyquaternaries, polyDADMAC, Epi-DMA, coagulants often have a higher charge density and lower molecular weight than a flocculant, often when coagulants are added to a liquid containing finely divided suspended particles, it destabilizes and aggregates the solids through the mechanism of ionic charge neutralization, additional properties and examples of coagulants are recited in *Kirk-Othmer Encyclopedia of Chemical Technology*, 5th Edition, (2005), (Published by Wiley, John & Sons, Inc.).

"Detackify*" means to reduce the adhesion and/or persistence of a composition of matter (typically paint) within some vessel or apparatus such as but not limited to a paint gun or sprayer and/or industrial paint system, this includes the removal of a dispersion of paint (such as but not limited to water based paint) from within a carrier medium such as water.

"Effective amount" means a dosage of any additive that affords an increase in one of the three quantiles when compared to an undosed control sample.

"Flocculant" means a composition of matter which when added to a liquid carrier phase within which certain particles are thermodynamically inclined to disperse, induces agglomerations of those particles to form as a result of weak physical forces such as surface tension and adsorption, flocculation often involves the formation of discrete globules of particles aggregated together with films of liquid carrier interposed between the aggregated globules, as used herein flocculation includes those descriptions recited in ASTME 20-85 as well as those recited in Kirk-Othmer Encyclopedia of Chemical Technology, 5th Edition, (2005), (Published by Wiley, John & Sons, Inc.).

"Purge Fluid" means a substantially fluid composition of matter comprising suitable for passage through an apparatus such as an industrial painting system which will substantially remove residual, adhering, and/or other paint matter from the apparatus or industrial painting system.

"Separation" means a mass transfer process that converts a mixture of substances into two or more distinct product mixtures, at least one of which is enriched in one or more of the mixture's constituents, it includes but is not limited to such processes as: Adsorption, Centrifugation, cyclonic separation, density based separation, Chromatography, Crystallization, Decantation, Distillation, Drying, Electrophoresis, Elutriation, Evaporation, Extraction, Leaching extraction, Liquid-liquid extraction, Solid phase extraction, Flotation, Dissolved air flotation, Froth flotation, Flocculation, Filtration, Mesh filtration, membrane filtration, microfiltration, ultrafiltration, nanofiltration, reverse osmosis, Fractional distillation, Fractional freezing, Magnetic separation, Precipitation, Recrystallization, Sedimentation, Gravity separation, Sieving, Stripping, Sublimation, Vapor-liquid separation, Winnowing, Zone refining, and any combination thereof.

"Spent Purge fluid" means Purge Fluid that has in fact been passed through an apparatus or industrial painting system and therefore might further comprise impurities contacted during or after such passage, the impurities may include but are not limited to dirt, dust, paint particles, rust, eroded pieces of an industrial painting system, metals particles, hair, skin, fabric, salt, acid, alkali, fibers, food particles, and any combination thereof.

In the event that the above definitions or a description stated elsewhere in this application is inconsistent with a meaning (explicit or implicit) which is commonly used in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the Kirk-Othmer Encyclopedia of Chemical Technology, 5th Edition, (2005), (Published by Wiley, John & Sons, Inc.) this definition shall control how the term is to be defined in the claims.

The present application discloses chemical and mechanical approaches for the treatment of spent purge and the recovery of purge fluids. In some aspects, the presently disclosed spent purge recycling system is incorporated into an automotive plant where water-based paints are utilized for painting cars and parts/components thereof. However, the presently disclosed spent purge recycling system is not limited to use in the automotive industry and could be used in any industry or manufacturing operation where it is desirable to recover a nonflammable solvent or purge fluids used to purge paint guns, paint lines, and associated equipment.

In at least one embodiment, the purge fluid may comprise from about 50% to about 99% water and from about 1% to about 50% solvent. In other aspects, the purge fluid may comprise from about 75% to about 99% water and from about 1% to about 25% solvent. In one particular aspect, the purge fluid comprises about 95% water and about 5% solvent. The solvent can be any solvent, or combination of solvents, conventionally used in the art to clean or purge paint lines/guns. Illustrative, non-limiting examples of solvents are selected from the group consisting of dibasic esters, propylene glycol methyl ether acetate, propylene glycol ethers, dipropylene glycol ethers, methyl ethers of propylene glycol, methyl ethers of dipropylene glycol, methyl ethers of tripropylene glycol, phenyl ethers, ethylene glycol monobutyl ether, and any combination thereof. In one particular aspect, the purge fluid comprises water and ethylene glycol monobutyl ether. The purge fluid may comprise any other components associated with conventional purge fluids, such as, but not limited to, penetrants, such as soaps, and wetting agents, such as surfactants, to help dissolve and lift paints/resins from age paint lines and/or guns.

In general, an industrial painting system may utilize a spray booth including one or more paint guns located inside of the booth. An example of a paint booth and related system can be found in U.S. Pat. Nos. 5,836,321, 5,972,865, and 5,072,881, the contents of each being expressly incorporated into the present application in their entirety. The paint guns may be used paint articles or components/parts of the articles. For example, in some aspects, the paint guns are used to paint a motor vehicle body or any component of a motor vehicle body. Usually, a paint gun is connected via a manifold system to a paint line, which feeds the desired color of paint to the gun from a paint storage unit. The paint storage tank may include one or ore paint reservoirs, each reservoir containing a different color and/or type of paint. The painting system may also comprise a purge fluid storage tank comprising the purge fluid. In any aspect, valves, such as pneumatically actuated valves, may be positioned in a manner to control the flow of individual paint colors or purge fluid from, the storage tanks, through the paint lines, and into the paint guns.

In operation, when a particular valve is opened, the color of paint associated with that valve will flow from the reservoir or storage tank, usually under pressure, through the paint lines and into the one or more paint guns. Once the component or article has been fully painted, the valve may be closed, thereby stopping the flow paint. However, even after the paint flow has been stopped, the manifold, paint guns, and paint lines will contain some amount of the paint or coating material. Thus, these components will need to be purged before another color of paint is sent through the paint lines into the guns.

Conventional practice is to inject a material, such as a liquid and/or gas, into the paint lines, which exits through the paint guns, thereby purging the former paint color from the system. In some aspects, the end of the paint line associated with the paint reservoir may be placed in fluid communication with a purge fluid storage tank. A valve associated with the purge fluid storage tank may then be opened and a purge fluid, under pressure, can flow from the storage tank, through the paint lines, optional manifold, and paint guns, thereby purging all components of the system. Once it exits the paint gun, the purge fluid is considered "spent," and the spent purge is then transported, either by gravity, pumps, channels, etc., from the booth into a spent purge accumulation tank.

In some aspects, the spent purge accumulation tank is located beneath the floor of the paint booth and there are channels through the floor allowing the spent purge to travel into the spent purge accumulation tank. In other aspects, the spent purge may be collected and actively pumped through a conduit and into a spent purge accumulation tank. The spent purge will generally include the purge fluid and any contaminants from the paint lines and guns, such as paint resins and pigments.

In certain aspects, the painting system may comprise one or more pumps. The end of the paint line in communication with the paint reservoir can be placed in fluid communication with the purge fluid storage tank. A pump associated with the storage tank may be activated, thereby causing purge fluid to flow into and through the paint line and paint gun. The spent purge is then transported, either by gravity, pumps, channels, etc., into a spent purge accumulation tank. Again, the spent purge accumulation tank may be located beneath the floor of the paint booth as described above and/or the spent purge may be collected and actively pumped through a conduit and into a spent purge accumulation tank. Once the spent purge is collected in the spent purge accumulation tank, it may be treated and components thereof may be recycled.

FIG. 1 shows a flow chart of an aspect of the presently disclosed spent spurge recycling system. In at least one embodiment the system utilizes one or more filters. Such filter(s) may be any structure constructed and arranged to remove suspended material from a liquid carrier medium. Representative examples include but are not limited to sand filters, clarifiers, filter paper, membrane filters, NF, UF, MF, submerged filters, pressure filters, centrifuges, cyclones, hydrocyclones, electrostatic precipitators, gravity separators, mist eliminators, screeners, steam traps, absorbers, adsorbers, biofilters, crystallizers, dehumidifiers, distillation columns, dryers, evaporators, extractors, humidifiers, ion exchange columns, strippers, and any combination thereof. In at least one embodiment the filter includes one or more of the filtration techniques disclosed in paper *Terminology for Membranes and Membrane Processes*, by W J Koros et al., Journal of Membrane Science, Vol. 120 pp. 149-159 (1996). In at least one embodiment the filter comprises any one or more of the above mentioned chemical separation processes.

In connection with the system described in FIG. 1, the flow/transportation of fluids, flocculated solids, chemicals, and any other components of the spent purge and/or reclaimed purge may be facilitated by gravity, pressure, pumps, motors, etc. In one aspect, a conduit (101) may be provided between the spent purge accumulation tank (100) and a mix tank (102). The spent purge may travel from the spent purge accumulation tank (100) to the mix tank (102) via the conduit (101) and various treatment steps may take place in the mix tank.

For example, in one aspect, one or more coagulants are added to the spent purge in the mix tank (102). In another aspect, one or more flocculants may be added to the spent purge in the mix tank (102). In an additional aspect, water may be added to the mix tank (102) to dilute the spent purge. The appropriate dosage of water may be determined, for example, by conventional jar testing techniques. It should be noted that the spent purge may also be diluted with water in the spent purge accumulation tank (100). In a further aspect, the pH of the spent purge may be adjusted in the mix tank. For example, if it is desirable to lower the pH of the spent purge, chemicals (such as but not limited to hydrochloric acid, sulfuric acid, and/or any acid) may be added to the mix tank (102). If it is desirable to increase the pH of the spent purge, chemicals (such as but not limited to liquid caustic soda and/or a base) may be added to the mix tank (102). All, one, or any combination of the foregoing treatment steps may be taken in connection with the present disclosure.

Thus, in one aspect, one or more coagulants may be added or slowly mixed into the mix tank (102). Next, the pH of the mixture in the mix tank (102) may be taken by any conventional means and adjusted to a range of, for example, about 6.5 to about 9, if needed, by addition of an acid or a base, to facilitate coagulation. Then, in some aspects, one or more flocculants may be added to facilitate agglomeration and flocculation of the solids.

Conventionally, coagulants have been used as paint detackifiers. The flocculant may be useful for flocculating the contaminants, such as paint resins and pigments, in the spent purge. The present disclosure is not limited to any specific order of addition of chemicals to the spent purge. In some aspects, the coagulant(s) may be added to the spent purge, followed by an optional pH adjustment, followed by addition of the flocculant(s). In other aspects, the flocculant may be added before the coagulant, the flocculant and coagulant may be added at the same time, or the chemicals may be added sequentially, such as adding coagulant, then flocculant, then coagulant, then flocculant. The chemicals can be added manually or automatically. In certain embodiments, they may be provided in chemical storage tanks which are in fluid communication with the mix tank. In at least one embodiment the method involves using a detackifiers of a type or in an amount insufficient to undo the adhesion between paint and a solid surface but sufficient to separate paint from a liquid medium such as water.

In at least one embodiment, the flocculated solids may then settle to the bottom of the mix tank (102) and any solids/liquid separation technique may be used to separate the spent purge from the flocculated solids/contaminants. Alternatively, the flocculated solids/spent purge mixture may be transferred from the mix tank (102) via conduit (103) into a settling tank (104), where the flocculated solids can settle to the bottom of the tank and any solids/liquid separation technique may be used to separate the spent purge from the flocculated solids/contaminants. Also, the clean overflow in the settling tank (104) can simply be transferred via conduit (110) into the reclaimed purge tank (106).

The spent purge/flocculated solids may be transferred to a decanter, centrifuge, and/or other separation device (105). Alternatively, a plate frame press, a gravity plate, or dissolved air flotation (DAF) may be used for the solid/liquid separation. Once separation of the flocculated components from the spent purge has occurred, the dewatered solids/contaminants may be discarded. The aqueous phase comprising water and solvent, which may be referred to as "reclaimed purge," may then be transferred to a reclaimed purge fluid tank (106) or sent directly into a clean purge supply tank (109). In at least one embodiment the aqueous phase may pass through a filter before entering the reclaimed purge fluid tank (106).

In an additional aspect, the solids from the treated spent purge may be allowed to concentrate and settle by gravity and the underflow of the mix tank (102) or settling tank (104) is transferred to a bowl or decanter centrifuge where the solids are concentrated, removed, and dewatered. The water phase containing the reclaimed purge (overflow) may be returned to the purge supply tank (109) or sent to the reclaimed purge tank (106).

In some aspects, the reclaimed purge travels via a conduit (108) from the reclaimed purge tank (106), through a filter (107), and into the clean purge supply tank (109). The filter may have a pore size of up to about 0.2 µm or greater, such as from about 0.1 µm to about 0.2 µm, to remove any remaining suspended solids that may pass through the centrifuge or the concentration tank overflow.

Once in the clean purge supply tank (109), the reclaimed purge has been recycled and may once again be used to purge and/or clean the paint lines and paint guns. The reclaimed purge in the clean purge supply tank (109) may be analyzed by any conventional water analysis technique to determine its composition and if necessary, more solvent or more water may be added to the tank (109) to achieve a desired ratio of water to solvent in the purge fluid. In some aspects, the desired ratio may be from about 50:50 to about 99:1, or any ratio therebetween, such as about 75:25 or about 95:5.

In at least one embodiment the coagulant contains little, no, substantially no, or essentially no chloride.

A number of coagulants may be used in this invention. Representative examples include but are not limited to coagulant compositions comprising aluminum chlorohydrate, cationized starch and polymer, inorganic coagulants and blends of inorganic coagulants and organic polymers, and any combination thereof. In at least one embodiment coagulant dosages ranged from 1,000 ppm to 20,000 ppm with optimal dosages 1000-2000 ppm.

A number of flocculants may be used in this invention. The appropriate type of polymeric flocculant used might be dependent on the nature and amount of the coagulant used. Suitable flocculants can include cationic polymers, anionic polymers, nonionic polymers and amphoteric polymers, and any combination thereof. Generally, polymeric flocculants having weight average molecular weights of at least $2\times10^6$ are preferred. More preferably, the molecular weight should exceed about $6\times10^6$. Representative examples of suitable flocculants include long chain high molecular weight polyacrylamides and copolymers of acrylic acid and acrylamide or long chain polymethacrylamides, and any combination thereof. Preferred flocculants are nonionic or slightly anionic polyacrylamides (hydrolyzed polyacrylamides) having a weight average molecular weight ranging from about $6\times10^6$ to about $20\times10^6$. In at least one embodiment the anionic functionality of such hydrolyzed polyacrylamides does not exceed about 30 mole % by weight.

A number of cationic polyelectrolytes may be used in this invention. Representative examples of cationic polyelectrolytes which may be used as flocculants in the instant invention include but are not limited to polyphosphonium compounds, polysulfonium compounds, quaternary ammonium compounds, polymers of methacryloyloxyethyl trimethylammonium methyl sulfate (METAMS), polymers of methacrylamido propyl trimethylammonium chloride (MAPTAC), polymers of acryloyloxyethyl trimethyl ammonium chloride (AETAC), polymers of methacryloyloxyethyl trimethylammonium chloride (METAC), and polymers prepared from combinations of METAMS, MAPTAC, AETAC and/or METAC polymerized with acrylamide and/or methacrylamide, and any combination thereof. Representative of quaternary ammonium compounds are diethyl diallyl ammonium and dimethyl diallyl ammonium polymers and salts thereof.

In at least one embodiment the flocculant used in the instant invention is a copolymer of acrylamide and acryloyloxyethyl trimethylammonium chloride (AETAC) with a weight average molecular weight of no less than 2×106 and a mole percent of AETAC of between 30 and 80%, and any combination thereof.

In at least one embodiment the flocculant dosages for this application ranged from 0-1,000 ppm with an optimal range of 10-500 ppm.

As can be seen, the presently disclosed spent purge recycling system provides industries with an effective way to treat and process spent purge. It significantly reduces the amount of "waste" an operator needs to have transported off site for processing or disposal. Further, it allows an operator to recover and recycle materials (e.g. purge solvent and water) that would have normally been lost as waste products. In a paint booth operation, capturing and recycling the purge solvent as opposed to wasting it into the pit results in better performance of the spray booth detackifier program, it also allows better program management of the paint detackification process, and it results in reduced maintenance costs of the paint spray booth system by eliminating excess settled sludge removal during yearly pit cleanouts.

In at least one embodiment because the waste has been largely, substantially, or entirely de watered the mass of the waste is up to 95% or greater than would otherwise be the case had the spent purge fluid not undergone the above described process.

EXAMPLES

The foregoing may be better understood by reference to the following examples, which are presented for purposes of illustration and are not intended to limit the scope of this disclosure. In particular, the examples demonstrate representative examples of principles innate to the disclosure and these principles are not strictly limited to the specific condition recited in these examples. As a result, it should be understood that the disclosure encompasses various changes and modifications to the examples described herein, and such changes and modifications can be made without departing from the spirit and scope of the disclosure, and without diminishing its intended advantages. It is therefore intended that such changes and modifications be covered by the appended claims.

The inventors discovered that the coagulant composition comprising aluminum chlorohydrate, cationized starch and polymer, in conjunction with a flocculant, may be used to agglomerate and separate paint solids in a spent or waste purge sample. The treated spent purge may then be processed by mechanical means on-site and the water and/or solvent could be recovered and reused as a make-up source for clean purge fluid. Analytical data from pilot testing showed that in accordance with the compositions and methods disclosed herein, about 75% to about 80% of the ethylene glycol monobutyl ether may be recovered from the spent purge. Treatment using the compositions and methods disclosed herein also allowed the paint residue to be separated, concentrated, and removed. This will significantly reduce the amount of waste being transported off site for disposal.

Testing was conducted to determine if the reclaimed purge could be returned to the clean purge system and reused. Samples of reclaimed purge comprising water and ethylene glycol monobutyl ether were generated and filtered with a 0.2 μm filter to prevent any particulates from being transferred to the clean purge system. The solvent in water concentration was checked and a small amount of ethylene glycol monobutyl ether was added to the reclaimed purge samples to achieve a ratio of water to ethylene glycol monobutyl ether of 90:10. It was experimentally verified that the reclaimed solvent/water mixture could be added back to the purge fluid stream and reused as purge fluid for cleaning.

While this invention may be embodied in many different forms, there are described in detail herein specific embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments mentioned herein, described herein and/or incorporated herein. In addition the invention encompasses any possible combination that also specifically excludes any one or some of the various embodiments mentioned herein, described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to." Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method of recovering purge fluid comprising:
providing a spent purge fluid comprising water, a solvent, and a solid material, wherein the solid material comprises paint particles;
adding an effective amount of one or more coagulants to the spent purge fluid, wherein the coagulant comprises aluminum chlorohydrate, cationized corn starch and polymer;
adding an effective amount of one or more flocculants to the spent purge fluid, wherein the effective amount of one or more flocculants is added to the spent purge fluid before adding of the effective amount of one or more coagulants to the spent purge fluid, and wherein the one or more flocculants facilitate flocculation of the paint particles and the one or more flocculants comprises a partially hydrolyzed polyacrylamide polymer having a weight average molecular weight ranging from $2 \times 10^6$ to $20 \times 10^6$ Daltons and the portion of the polyacrylamide polymer having hydrolyzed acrylamide structural units should not exceed 30% by weight;
allowing the flocculated paint particles to settle; thereby forming a settled solid material; and
separating the flocculated paint particles from the spent purge fluid, thereby recovering the solvent, wherein the solvent is ethylene glycol monobutyl ether.

2. The method of claim 1, further comprising the step of adjusting pH of the spent purge fluid to facilitate coagulation.

3. The method of claim 2, wherein the step of adjusting the pH of the spent purge fluid is made with sodium hydroxide.

4. The method of claim 1, further comprising the step of diluting the spent purge fluid with water.

5. The method of claim 1, further comprising the step of filtering the purge fluid after it has been separated from the flocculated paint particles.

6. The method of claim 1, further comprising the step of transferring the spent purge fluid into a settling tank after adding the effective amount of one or more flocculants.

7. The method of claim 6, further comprising the steps of transferring an underflow of the settling tank comprising the settled solid material to a decanter centrifuge, concentrating the solid material, and dewatering the solid material.

8. The method of claim 1, wherein the one or more flocculants comprise a partially hydrolyzed polyacrylamide polymer having a weight average molecular weight of about $6\times10^6$ Daltons.

9. A method of reducing an amount of spent purge waste comprising:
providing a spent purge waste comprising water, a solvent, and a solid material, wherein the solid material comprises a member selected from the group consisting of paint resins, pigments, and any combination thereof, wherein the solvent is ethylene glycol monobutyl ether;
adding an effective amount of one or more coagulants to the spent purge waste wherein the coagulant consists of aluminum chlorohydrate, cationized corn starch and polymer;
adding an effective amount of one or more flocculants to the spent purge waste, wherein the one or more flocculants facilitate flocculation of the solid material in the spent purge waste, and wherein the flocculant comprises a partially hydrolyzed polyacrylamide polymer having a weight average molecular weight ranging from $2\times10^6$ to $20\times10^6$ Daltons and the portion of the polyacrylamide polymer having hydrolyzed acrylamide structural units should not exceed 30% by weight;
allowing the flocculated solid material to settle, thereby forming a settled solid material;
separating the flocculated solid material from the water and the solvent;
recycling the water and solvent; and
disposing of only the flocculated solid material.

10. The method of claim 9, further comprising the step of transferring the spent purge waste into a settling tank after adding the one or more flocculants.

11. The method of claim 10, further comprising the steps of transferring an underflow of the settling tank comprising the settled solid material to a decanter centrifuge, concentrating the solid material, and dewatering the solid material.

12. The method of claim 11, wherein the one or more flocculants comprise a partially hydrolyzed polyacrylamide polymer having a weight average molecular weight of about $6\times10^6$ Daltons.

13. The method of claim 9, further comprising the step of adjusting pH of the spent purge waste.

14. The method of claim 13, wherein the step of adjusting the pH of the spent purge waste is made with sodium hydroxide.

15. A method for cleaning a flow path of an automated painting apparatus comprising:
a) providing an automated painting apparatus having a paint line in fluid communication with a paint gun;
b) pumping a purge fluid comprising water and ethylene glycol monobutyl ether into an end of the paint line, whereby the purge fluid travels through the paint line, into the paint gun, and out of an end of the paint gun;
c) collecting the purge fluid in a tank;
d) adding an effective amount of one or more coagulants to the purge fluid wherein the coagulant comprises aluminum chlorohydrate, a cationized corn starch and polymer;
e) adding an effective amount of one or more flocculants to the purge fluid, wherein the one or more flocculants facilitate flocculation of paint particles in the purge fluid, and wherein the flocculant comprises a partially hydrolyzed polyacrylamide polymer having a weight average molecular weight ranging from $2\times10^6$ to $20\times10^6$ Daltons and the portion of the polyacrylamide polymer having hydrolyzed acrylamide structural units should not exceed 30% by weight;
f) allowing the flocculated paint particles to settle;
g) separating the flocculated paint particles from the purge fluid; and
h) transporting the separated purge fluid to a clean purge fluid supply tank, optionally wherein steps a) through h) are repeated a plurality of times.

16. The method of claim 15, wherein the one or more flocculants comprise a partially hydrolyzed polyacrylamide polymer having a weight average molecular weight of about $6\times10^6$ Daltons.

17. The method of claim 15, further comprising the step of adjusting pH of the purge fluid using sodium hydroxide.

* * * * *